United States Patent [19]

Hatta

[11] Patent Number: 5,506,839
[45] Date of Patent: Apr. 9, 1996

[54] CONGESTION CONTROL METHOD, TERMINAL ADAPTER USING THE METHOD AND COMMUNICATIONS SYSTEM USING THE TERMINAL ADAPTER

[75] Inventor: Hiroyuki Hatta, Kawasaki, Japan

[73] Assignee: Fujitsu Limited, Kanagawa, Japan

[21] Appl. No.: 281,350

[22] Filed: Jul. 27, 1994

[30] Foreign Application Priority Data

Nov. 24, 1993 [JP] Japan ................................ 5-293602

[51] Int. Cl.$^6$ ...................................................... H04J 3/12
[52] U.S. Cl. ......................... 370/60; 370/94.1; 370/110.1
[58] Field of Search .................................. 370/13, 17, 60, 370/60.1, 61, 79, 94.1, 94.2, 110.1, 99

[56] References Cited

U.S. PATENT DOCUMENTS

5,390,173  2/1995  Spinney ............................ 370/94.1 X

Primary Examiner—Melvin Marcelo

[57] ABSTRACT

In a congestion control method adapted to a communications system having a network, a terminal and a terminal adapter which is provided between the network and the terminal and interchanges a first frame format handled by the network and a second frame format handled by the terminal, the terminal adapter receives a signal sent in the first frame format via the network and detects whether or not the signal includes congestion notification information indicating occurrence of a congestion in the communications system. The terminal adapter then sends a signal in the second frame format including first notification information to the terminal. The terminal adapter then performs a predetermined control process for recovery from the congestion when the terminal receives the signal in the second frame format.

16 Claims, 11 Drawing Sheets

| L3 | X.25 | |
|---|---|---|
| L2 | Q.921 (LAPD) | Q.922 (LAPF) |
| L1 | PHYSICAL LAYER | PHYSICAL LAYER |

| L2 | Q.922 ANNEX-A |
|---|---|
| L1 | PHYSICAL LAYER |

| L3 | X.25 | X.25 |
|---|---|---|
| L2 | Q.922 (LAPF) | Q.921 (LAPD) |
| L1 | PHYSICAL LAYER | PHYSICAL LAYER |

[ LAPD FRAME FORMAT ]

FIG. 3A

[ LAPF FRAME FORMAT ]

CONGESTION CONTROL METHOD, TERMINAL ADAPTER USING THE METHOD AND COMMUNICATIONS SYSTEM USING THE TERMINAL ADAPTER

BACKGROUND OF THE INVENTION

1. Field of the Invention

The present invention relates to a congestion control in a communications network, and more particularly to a congestion control in a communications network using a frame relay method.

Nowadays, packet communications networks which conform with the ITU-T X. 25 standard have been reduced to practice. At nodes provided in a package communications network, packets are assembled from data from terminal equipment and are sent to communications paths. Further, at the nodes, packets received from the communications paths are disassembled and sent to the terminal equipment. At each node, a confirmation process is carried out in which it is determined whether or not a packet has duly been received. When it is confirmed that the packet has duly been received, the packet is sent to the next node.

2. Description of the Prior Art

Recently, a frame relay method has been proposed with improvements in the quality of transmission paths such as optical fibers (see Q.922 and Q.933 of the ITU-T Recommendations, the disclosure of which is hereby incorporated by reference). In a network using the frame relay method, each node simply sends the received packet to the next node without any modification. That is, each node does not determine whether or not the packets have duly been received, except for a frame check sequence (FCS). The checking process for determining whether or not the packets have duly been received is carried out by the terminal equipment which receives the packets. With the above method, it becomes possible to reduce the time it takes to transmit the packets.

When actually constructing a network, it is necessary to consider a congestion taking place in the network. More particularly, it is necessary to predetermine processes for coping with faults in the network and the resource limitations of the terminal equipment. In the packet communications networks conforming with the ITU-T X. 25 standard, each node provided therein performs the check operation. Hence, each node can easily cope with congestions occurring in the network. In this case, the node which detects a congestion sends the terminal equipment a predetermined indication indicating that packets cannot be received. The ITU-T X. 25 standard defines the above indication as an RNR (Receive Not Ready) frame signal. The terminal equipment which receives the RNR frame stops sending packets and/or limits the amount of information to be sent. When the congestion or fault has been removed, a signal indicating the above is sent to the terminal equipment. The ITU-T X. 25 standard defines the above signal as an RR (Receive Ready) signal.

The network using the frame relay network operates in a way different from that of the ITU-T X. 25 standard network. In the network using the frame relay network, each node sends the received packets to the next node without any modification. Hence, it is necessary to cope with the congestions and faults in a way different from that in the ITU-T X. 25 standard network. Regarding the congestions, the Q. 922 and Q.933 of the ITU-T Recommendations define the following ways. When a congestion occurs in the network, a congestion notification bit notifying the terminal equipment of the occurrence of the congestion is turned ON (for example, switched to "1"). The terminal equipment which receives the congestion notification bit in the ON state knows that the congestion occurs in the network and executes a predetermined congestion control process. For example, the terminal equipment stops sending information and limits the amount of information to be sent. According to the ITU-T Recommendations, an FECN (Forward Explicit Congestion Notification: congestion notification in the forward direction) bit and a BECN (Backward Explicit Congestion Notification: congestion notification in the backward direction) bit are defined as the above congestion notification bit. When the network is recovered from the congestion, the network turns OFF congestion recovery notification information and sends it to the terminal equipment.

By the way, there is a case where a packet terminal (a terminal conforming with the ITU-T X. 25 standard) is connected to a network using the frame relay method (hereinafter such a network is referred to as a frame-relay network). For example, such a case will occur by connecting a packet terminal conventionally used to a frame-relay network newly constructed. In this case, a terminal adapter is provided between the packet terminal and the frame-relay network in order to absorb the difference between the X. 25-based frame format (LAPD: Link Access Procedure on the D-channel) and the frame format based on the frame relay method (LAPF: Link Access Procedure for Frame mode bearer service). In other words, the terminal adapter has the function of interchanging the different formats with each other.

In this case, if the frame-relay network is congested, the terminal adapter sends the terminal adapter and a frame-relay terminal a frame in which the above-mentioned FECN or BECN is ON. The frame-relay terminal is a terminal that conforms with the frame network method. The terminal adapter which receives the above frame performs a process in which information transferred in the LAPF format is placed in the LAPD format or the LAPD format capsuled in the LAPF format is extracted.

However, the packet terminal accommodated in the frame-relay network via the terminal adapter cannot know the occurrence of a congestion in the frame-relay network. This is because the congestion notification bit is not included in the LAPD format. Similarly, the packet terminal cannot know the recovery of the congestion.

SUMMARY OF THE INVENTION

It is a general object of the present invention to provide a terminal adapter in which the above disadvantages are eliminated.

A more specific object of the present invention is to provide a congestion control method making it possible for a terminal accommodated in a network which processes signals of a format different from the format that can be processed by the terminal adapter to know the occurrence of a congestion taking place in the network and the recovery therefrom.

The objects of the present invention are achieved by a congestion control method adapted to a communications system having a network, a terminal and a terminal adapter which is provided between the network and the terminal and interchanges a first frame format handled by the network and a second frame format handled by the terminal, the congestion control method comprising the steps of:

(a) receiving, at the terminal adapter, a signal sent in the first frame format via the network and detecting whether or not the signal includes congestion notification information indicating occurrence of a congestion in the communications system;

(b) sending a signal in the second frame format including first notification information to the terminal from the terminal adapter; and (c) performing, at the terminal, a predetermined control process for recovery from the congestion when the terminal receives the signal in the second frame format.

Another object of the present invention is to provide a terminal adapter using the above method.

This object of the present invention is achieved by a terminal adapter adapted to a communications system having a network and a terminal, the terminal adapter being provided between the network and the terminal and interchanges a first frame format handled by the network and a second frame format handled by the terminal, the terminal adapter comprising:

first means for receiving a signal sent in the first frame format via the network and detecting whether or not the signal includes congestion notification information indicating occurrence of a congestion in the communications system; and second means for sending a signal in the second frame format including first notification information to the terminal, a predetermined control process for recovery from the congestion being carried out at the terminal when the terminal receives the signal in the second frame format.

Yet another object of the present invention is to provide a communications system using the above terminal adapter.

This object of the present invention is achieved by a communications system comprising:

a network;

a terminal; and a terminal adapter provided between the network and the terminal and interchanges a first frame format handled by the network and a second frame format handled by the terminal, the terminal adapter comprising:

first means for receiving a signal sent in the first frame format via the network and detecting whether or not the signal includes congestion notification information indicating occurrence of a congestion in the communications system; and second means for sending a signal in the second frame format including first notification information to the terminal, a predetermined control process for recovery from the congestion being carried out at the terminal when the terminal receives the signal in the second frame format.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
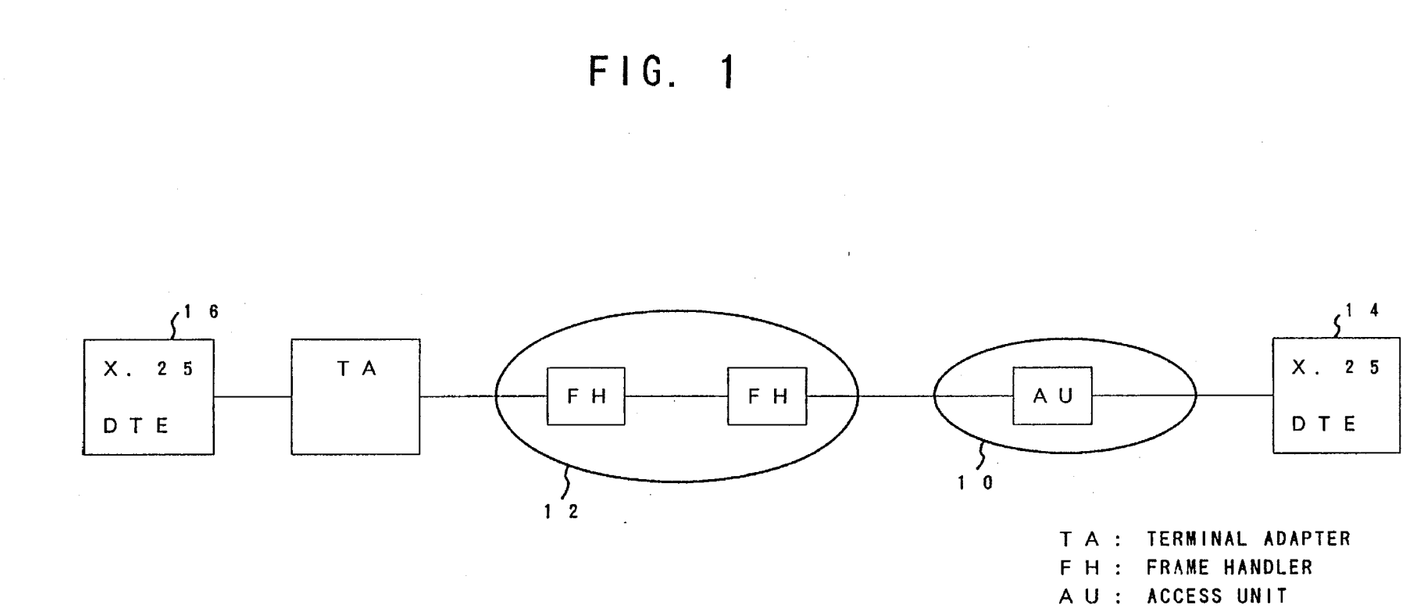
FIG. 1 is a block diagram of the structure of a communications system according to an embodiment of the present invention.

FIG. 1 shows the overall structure of a communications system according to a first embodiment of the present invention. The communications system shown in FIG. 1 includes a packet communications network 10 and a frame-relay network 12. The packet network 10 has an access unit AU, and the frame-relay network 12 has a frame handler FH. For the sake of convenience, the packet network 10 has a single access unit AU, and the frame-relay network 12 has two frame handlers FH. However, in practice, the packet network 10 includes a plurality of access units AU, and the frame-relay network 12 includes a plurality of frame handlers FH. A packet terminal (X. 25 DTE: Data Terminal Equipment) 14 is connected to the access unit AU of the packet network 10. A packet terminal (X. 25 DTE) 16 is connected to the frame handler FH of the frame-relay network 12 via the terminal adapter TA. In practice, a plurality of frame terminals are connected to the frame handler FH of the frame-relay network 12 although the frame terminals are not illustrated for the sake of convenience.

Figure 2A:
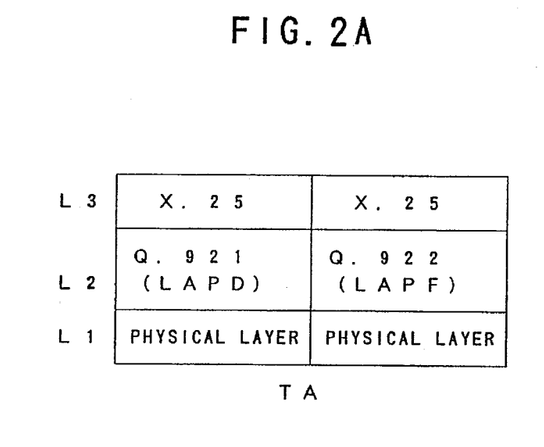
FIGS. 2A, 2B and 2C are diagrams showing protocol stacks of the communications system shown in FIG. 1.
Figure 2B:
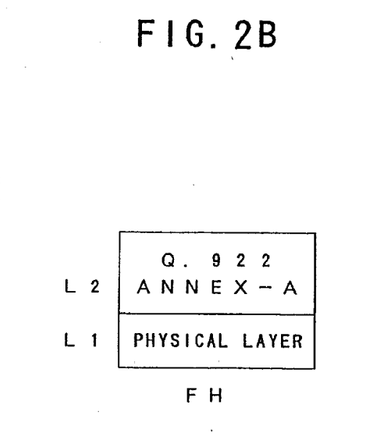
Figure 2C:
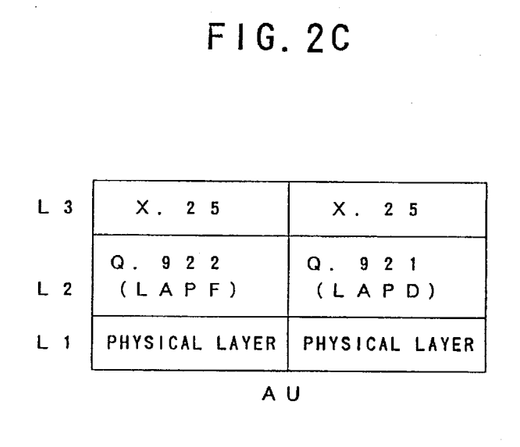

FIGS. 2A, 2B and 2C are diagrams of protocol stacks of the communications system shown in FIG. 1. More particularly, FIG. 2A shows protocol stacks of the terminal adapter TA, FIG. 2B shows the protocol stack of the frame handler FH, and FIG. 2C shows protocol stacks of the access unit AU. The terminal adapter TA has two protocol stacks. One of the two protocol stacks is made up of three layers L1, L2 and L3, which are a physical layer, a layer for defining Q. 921 (LAPD) procedures, and a layer for defining X. 25 procedures, respectively. The other protocol stack shown in FIG. 2A is made up of three layers L1, L2 and L3, which are a physical layer, a layer for defining X. 922 (LAPF) procedures, and a layer for defining X. 25 procedures, respectively. In the protocol stack of the frame handler FH shown in FIG. 2B, two layers L1 and L2, which are a physical layer and a layer for defining the procedures prescribed in ANNEX-A of the Q. 922. The access unit AU includes two protocol stacks. One of the two protocol stacks is made up of three layers L1, L2 and L3, which are a physical layer, a layer for defining Q. 922 (LAPF) procedures, and a layer for defining X. 25 procedures, respectively. The other protocol stack shown in FIG. 2C is made up of three layers L1, L2 and L3, which are a physical layer, a layer for defining X. 921 (LAPD) procedures, and a layer for defining X. 25 procedures, respectively. It will be noted that various combinations of protocol stacks can be selected on the basis of connection formations and service formations. In this regard, the protocols shown in FIGS. 2A, 2B and 2C are just an example.

Figure 3A:
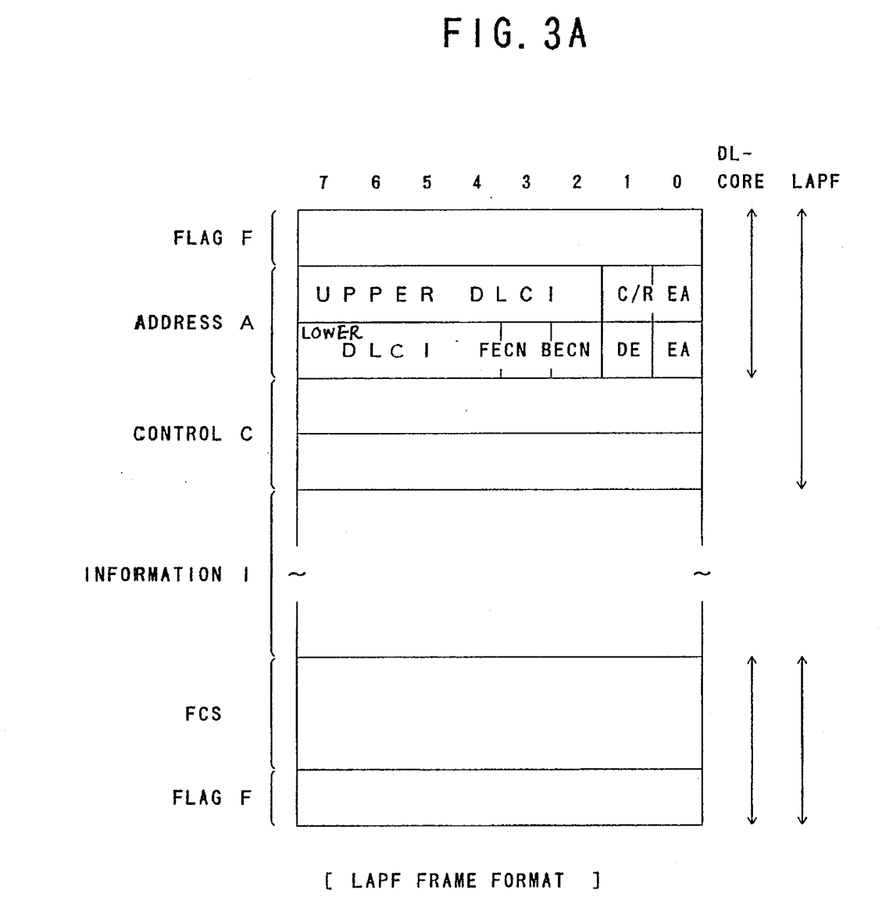
FIGS. 3A and 3B are frame formats used in the communications system shown in FIG. 1.
Figure 3B:
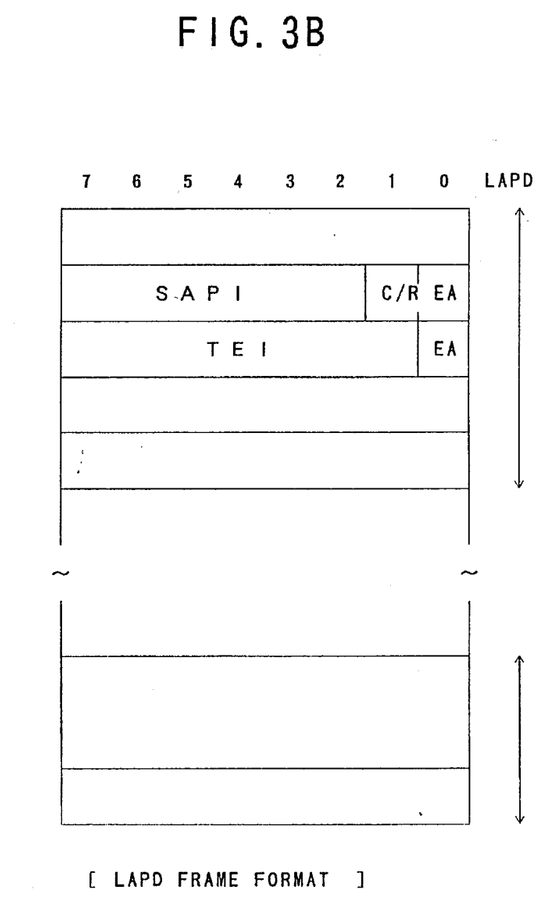

FIG. 3A shows the LAPF frame format defined in the ITU-T Q. 922 standard, and FIG. 3B shows the LAPD frame format defined in the ITU-T Q. 921 standard. As shown in FIGS. 3A and 3B, the frame formats includes a flag field F, an address field A, a control field C, an information field I, a frame check sequence field FCS and a flag field F. The LAPF frame format and the LAPD frame format are the same as each other except for the structure of the address field A.

The address field A of the LAPF frame format shown in FIG. 3A includes an address extension bit EA, a command/response indication bit C/R, a data link connection identifier DLCI, and a forward-direction congestion notification bit FECN, a backward-direction congestion notification bit BECN, and a discard enable bit DE.

The address field A of the LAPD frame format shown in FIG. 3B includes an address extension bit EA, a command/response indication bit C/R, a service access point identifier SAPI and a terminal end identifier TEI. The above bits are described in detail in the ITU-T Recommendations Q921 and Q922, and the bits other than the congestion notification bits FECN and BECN are not directly related to the present invention. Hence, a description of the bits other than the bits FECN and BECN will now be omitted.

When a congestion is detected in the frame-relay network 12 (FIG. 1), the frame handler FH in the frame-relay network 12 sets the value of the congestion notification bit FECN/BECN (symbol "/" denotes "and/or") to 1 (that is, turns ON the bit), and notifies the terminals related to the detected congestion of the occurrence of the congestion. When the frame-relay terminal detects the congestion notification bit "1", it performs the corresponding congestion control process.

The terminal adapter TA shown in FIG. 1 detects the congestion notification bit "1" from the frame-relay network 12, it generates the LAPD format from the LAPF format including the congestion notification bit "1". In other words, the terminal adapter TA generates the aforementioned RNR frame signal, as shown in FIG. 4.

Figure 4:
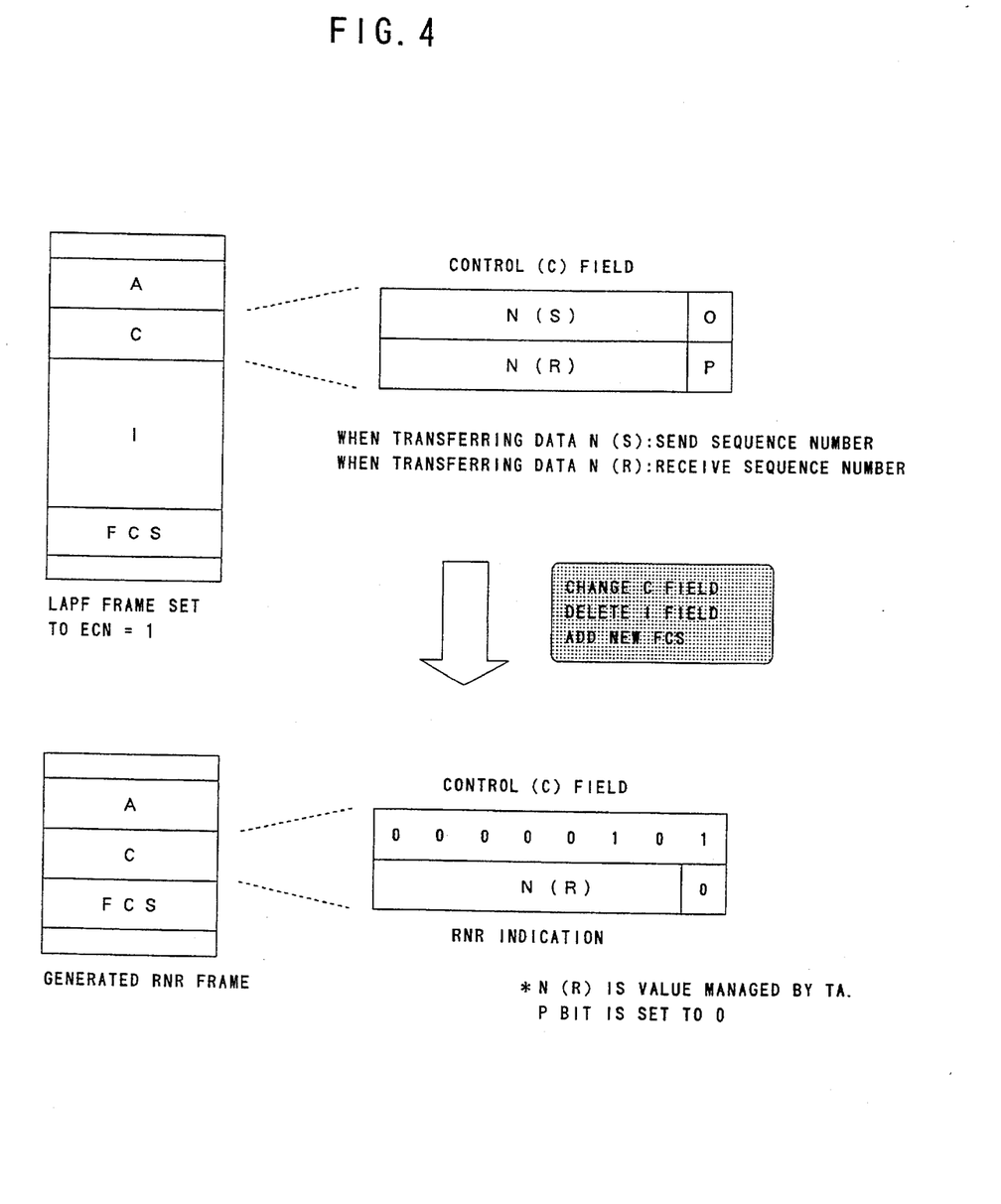
FIG. 4 is a diagram showing the operation of a terminal adapter according to a first embodiment of the present invention.

In FIG. 4, the control field C transferred in the LAPF frame format from the frame-relay network 12 includes a send sequence number N(S) and a receive sequence number N(R). By referring to the send sequence number N(S) and the receive sequence number N(R), it is possible to determine, at each frame terminal, whether or not information has duly been received.

When the terminal adapter TA detects a change of the congestion notification bit FECN/BECN from OFF ("0") to ON ("1"), the terminal adapter TA extracts the LAPF frame in which the BECN/BECN is "1"), and changes the control field C of the above frame. Further, the terminal adapter TA deletes the information field from the above frame, and adds a new frame check sequence to the frame. In the above manner, the terminal adapter TA generates the RNR frame signal understandable by the packet terminal 16. As shown in FIG. 4, the send sequence number N(S) is changed to an RNR code "10100000" from the least significant bit of the send sequence number N(S). Further, the RNR frame signal does not have the information field I. Further, bit P in the control field C is set to zero. Furthermore, the frame check sequence is replaced by a new one corresponding to the changing of the control field C and the deletion of the control field I. The packet terminal 16 can identify the RNR frame signal generated in the above-mentioned manner. When the packet terminal 16 receives the RNR frame signal, it executes a predetermined control process, for example, interrupting in sending packets or limiting the amount of information to be sent (flow control). The packet terminal 16 cannot recognize the occurrence of a congestion even when receiving the RNR frame signal. However, as a result of the above-mentioned predetermined control process, the packet terminal 16 controls recovery from the congestion.

When the terminal adapter TA detects a change of the congestion notification bit FECN/BECN from ON ("1") to OFF ("0"), it extracts the LAPF frame and changes the control field C of the above frame. Further, the terminal adapter TA deletes the information field from the frame and adds a new frame check sequence to the frame. In this manner, an RR frame signal understandable by the packet terminal 16 can be produced. When the packet terminal 16 receives the RR frame signal, it stops executing the above predetermined control process, so that the normal operation is restarted. The RR frame signal includes an RR code consisting of first eight bits "10000000" from the least significant bit in the control field C from the least significant bit.

In the following description, the RNR frame signal and the RR frame signal will now be referred to as a supervisory signal.

Figure 5:
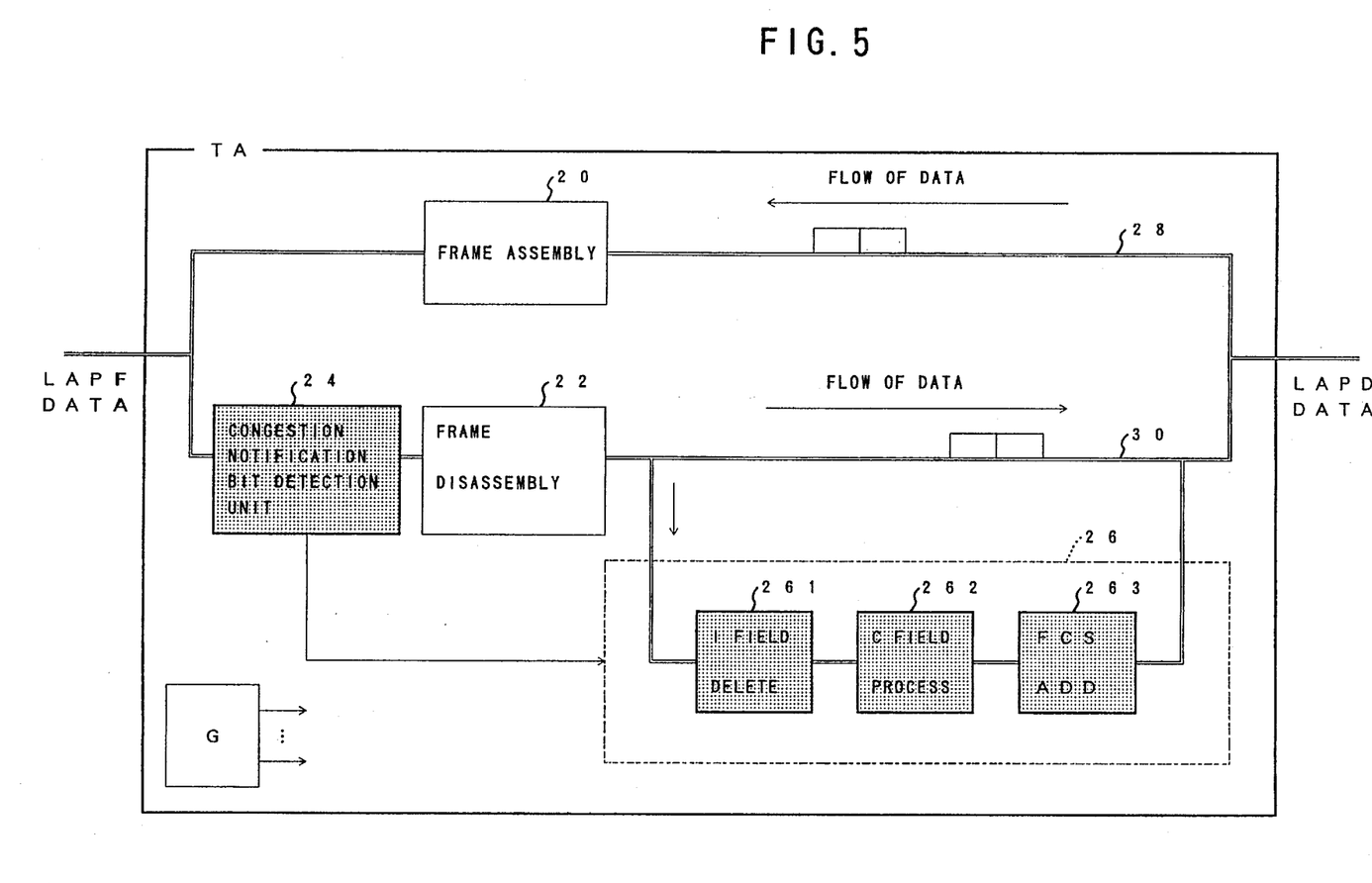
FIG. 5 is a block diagram of the structure of the terminal adapter shown in FIG. 1.

FIG. 5 is a block diagram of the terminal adapter TA, which is made up of a frame assembly unit 20, a frame disassembly unit 22, a congestion notification bit detecting unit detecting circuit 24, and a supervisory frame generating circuit 26. The frame assembly unit 20 is provided in a transmission path 28 that transfers information from the packet terminal 16 to the frame-relay network 12. The frame disassembly unit 22 and the congestion notification bit 24 are provided in a transmission path 30 that transfers information from the frame-relay network 12 to the packet terminal 16. The supervisory frame generating circuit 26 is provided in a branch path that branches from the transmission path 30. The dotted blocks shown in FIG. 5 denote the blocks which are newly added to the structure of the conventional terminal adapter according to the first embodiment of the present invention. The symbol "G" denotes a clock generator.

The frame assembly unit 20 assemblies data (LAPF data) in the LAPF frame format from data (LAPD data) in the LAPD frame format sent from the packet terminal 16. The congestion notification bit detecting unit 24 detects a change of the congestion notification bit FECN/BECN (from "0" to "1" or "1" to "0"), and controls the opening/closing of the signal line between the frame disassembly unit 22 and the supervisory frame generating circuit 26. The frame disassembly unit 22 disassembles the LAPF data from the frame-relay network 12 and derives LAPD data therefrom. The supervisory frame circuit 26 includes information filed deleting unit 261, a control field processing unit 262 and a frame check sequence (FCS) adding unit 263. The information field deleting unit 261 deletes the information field of the LAPF data having the detected congestion notification bit FECN/BECN. The control field processing unit 262 processes the control field C as shown in FIG. 4. The FCS adding unit 263 adds the new frame check sequence FCS. The supervisory frame generating circuit 26 thus configured generates the aforementioned supervisory frames (which are the RNR frame signals and the RR frame signals). The supervisory frames are sent to the packet terminal 16 via the signal line 30 provided in the terminal adapter TA and the transmission path.

Figure 6:
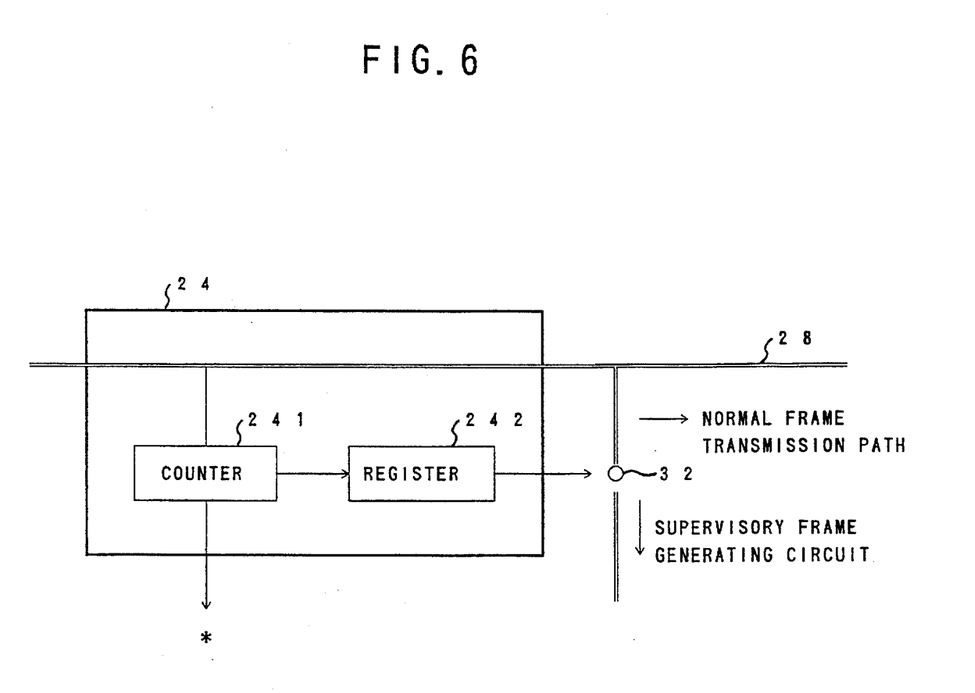
FIG. 6 is a block diagram of a congestion notification bit detecting unit shown in FIG. 5.

FIG. 6 is a block diagram of the structure of the congestion notification bit detecting unit 24 shown in FIG. 5. The congestion notification bit detecting unit 24 includes a counter 241 and a register 242. The counter 241 counts the bits of the received LAPF data every bit and specifies the congestion notification bit BECN/FECN. In this manner, the value of the congestion notification bit BECN/FECN can be detected. The register 242 holds the value of the congestion notification bit BECN/FECN ("0" or "1") output from the counter 241. When the congestion notification bit BECN or BECN is "1" a control signal for enabling (making a connection with the transmission path 28) a switch 32 is read from the register 242 and is applied thereto. The switch 32 is provided between the frame disassembly unit 22 (the illustration thereof is omitted) and the supervisory frame generating circuit 26. Further, when the counter 241 counts the end of the LAPF data (when one frame has just passed), the counter 242 outputs the control signal to the switch 32 via the register 242 so that the switch 32 is disabled. The value "1" of the congestion notification bit BECN/BECN is held in the register after the switch 32 is disabled.

Figure 7A:
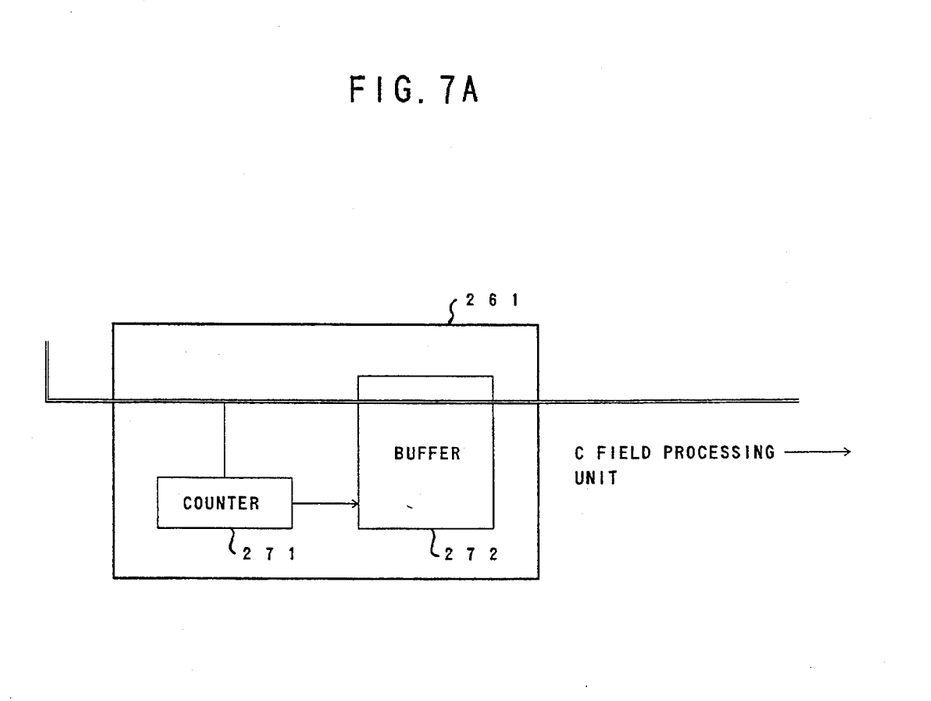
FIG. 7A is a block diagram of an information field deleting unit provided in a supervisory frame generating circuit shown in FIG. 5.

FIG. 7A is a block diagram of the structure of the information field deleting unit 261 shown in FIG. 5. The information field deleting unit 261 includes a counter 271 and a buffer 272. The counter 271 counts the bits of the LAPF data passing through the switch 32 shown in FIG. 6, and detects the address field A and the control field C thereof. During the when the counter 271 is detecting the address field A and the control field C, it outputs a write enable signal to the buffer 272. The address field A being considered has been converted to the LAPF frame format by the frame disassembly unit 22 shown in FIG. 5.

Figure 7B:
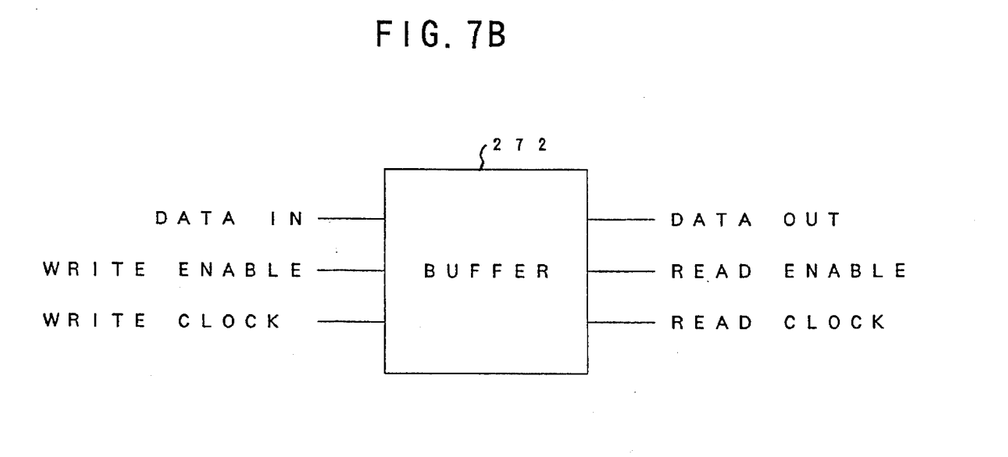
FIG. 7B is a block diagram of input and output signals of a buffer shown in FIG. 7A.

FIG. 7B shows input and output signals of the buffer 272. The LAPD data input to the supervisory frame generating circuit 26 via the switch 32 shown in FIG. 6 is written into the buffer 272 according to the write enable signal from the counter 271 shown in FIG. 7A and a write clock signal from the clock generator G shown in FIG. 5. The write enable signal is kept ON during the time when the counter 271 is detecting the address field A and the control field C. Hence, the data in the fields A and C is written into the buffer 272. As a result, data other than the data in the fields A and C is blocked by the buffer 272. The reading of data from the buffer 272 is carried out according to a read clock signal from the clock generator G and a read enable signal.

Figure 8:
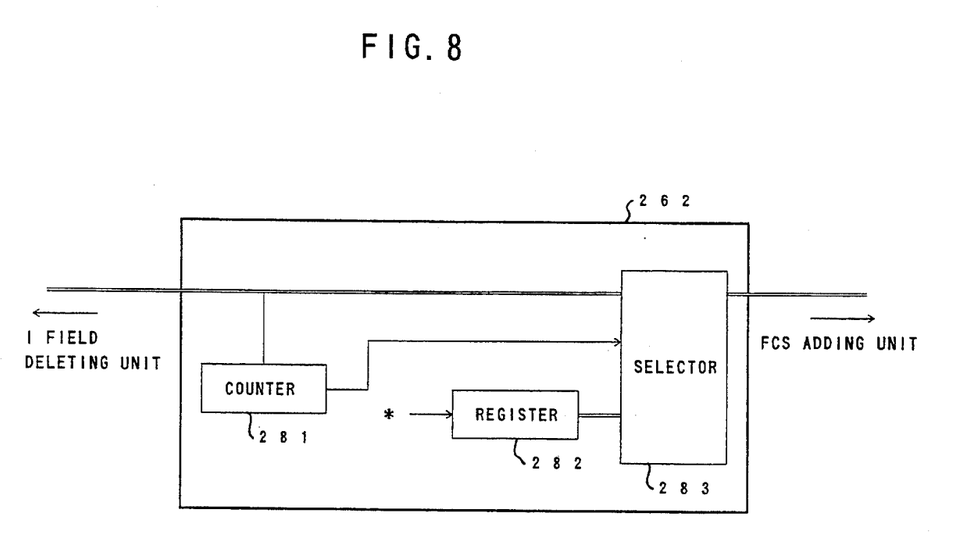
FIG. 8 is a block diagram of a control field processing unit shown in FIG. 5.

FIG. 8 is a block diagram of the information field processing unit 262 shown in FIG. 5. The information field processing unit 262 is made up of a counter 281, a register 282 and a selector 283. The counter 281 counts the bits of the data read from the buffer 272 shown in FIG. 7A, and the first eight bits of the control field C. A detection signal indicating the detection of the first eight bits of the control field C is applied to the selector 283 from the counter 281. The register 282 holds the eight-bit RNR code inserted into the control field C of the aforementioned RNR frame signal, and the eight-bit RR code inserted into the control filed C of the RR frame signal. The register 282 receives the control signal (which indicates a change of the congestion notification bit from "0" to "1" or "1" to "0") from the counter 241 shown in FIG. 6, and outputs either the RNR code or the RR code to the selector 283. The selector 283 receives the detection signal from the counter 281, and selects either the RNR code or the RR code received from the register 282 during the time when the first eight bits of the control field C are being indicated. Thereby, the first eight bits of the control field C are changed to the RNR code or the RR code.

The output signal of the selector 283 is given to the FCS adding unit 263 shown in FIG. 5. The FCS adding unit 263 calculates an error correction code with respect to the output signal of the selector 283 according to a conventional frame check sequence, and adds the error correction code thereto.

A description will now be given, with reference to FIG. 9, of the operation of the first embodiment of the present invention.

First of all, a description will be given of the normal operation in which the packet terminals 14 and 16 communicate with each other in a state in which no congestion takes place. The LAPD data from the terminal 14 is assembled in packets by the access unit AU of the packet network 10, is then assembled in LAPF frames (LAPF data) by the frame handler FH of the frame-relay network 12. The terminal adapter TA receives the LAPF data from the frame-relay network 12 (which is indicated as FR network 12 in FIG. 9 for the sake of convenience). The received LAPF data passes through the congestion notification bit detecting unit 24 shown in FIG. 5, and is converted into the LAPD data by the frame disassembly unit 22. Then, the LAPD data is output to the packet terminal 16 shown in FIG. 1. The LAPD data from the packet terminal 16 is converted into the LAPD data by the frame assembly unit 20 shown in FIG. 6. Then the LAPD data is transferred in the direction reverse to the above and is sent to the packet terminal 14.

If a congestion takes place in the frame-relay network 12, the frame handler FH detects occurrence of the congestion, and changes the congestion notification bit FECN/BECN in the LAPF data to be sent from "0" to "1". The congestion notification bit detecting unit 24 of the terminal adapter TA receives the LAPF data including the FECN/BECN bit "1", and turns ON the switch 32 (FIG. 6) via the register 242 (FIG. 6) at a predetermined timing. The information field deleting unit 261 of the supervisory frame generating circuit 26 deletes the information field of the received LAPD data. The control field processing unit 262 changes the control field C so that the first eight bits thereof is changed to the RNR code. By adding the FCS code to the output signal of the control field processing unit 262 by the FCS adding unit 263, the RNR frame shown in FIG. 4 is output to the packet terminal 16. The above-mentioned operation corresponds to part (a) of FIG. 9.

The packet terminal 16 which receives the RNR frame recognizes it and starts the predetermined control process. For example, the packet terminal 16 stops sending the LAPD data (part (b) of FIG. 9).

Figure 9:
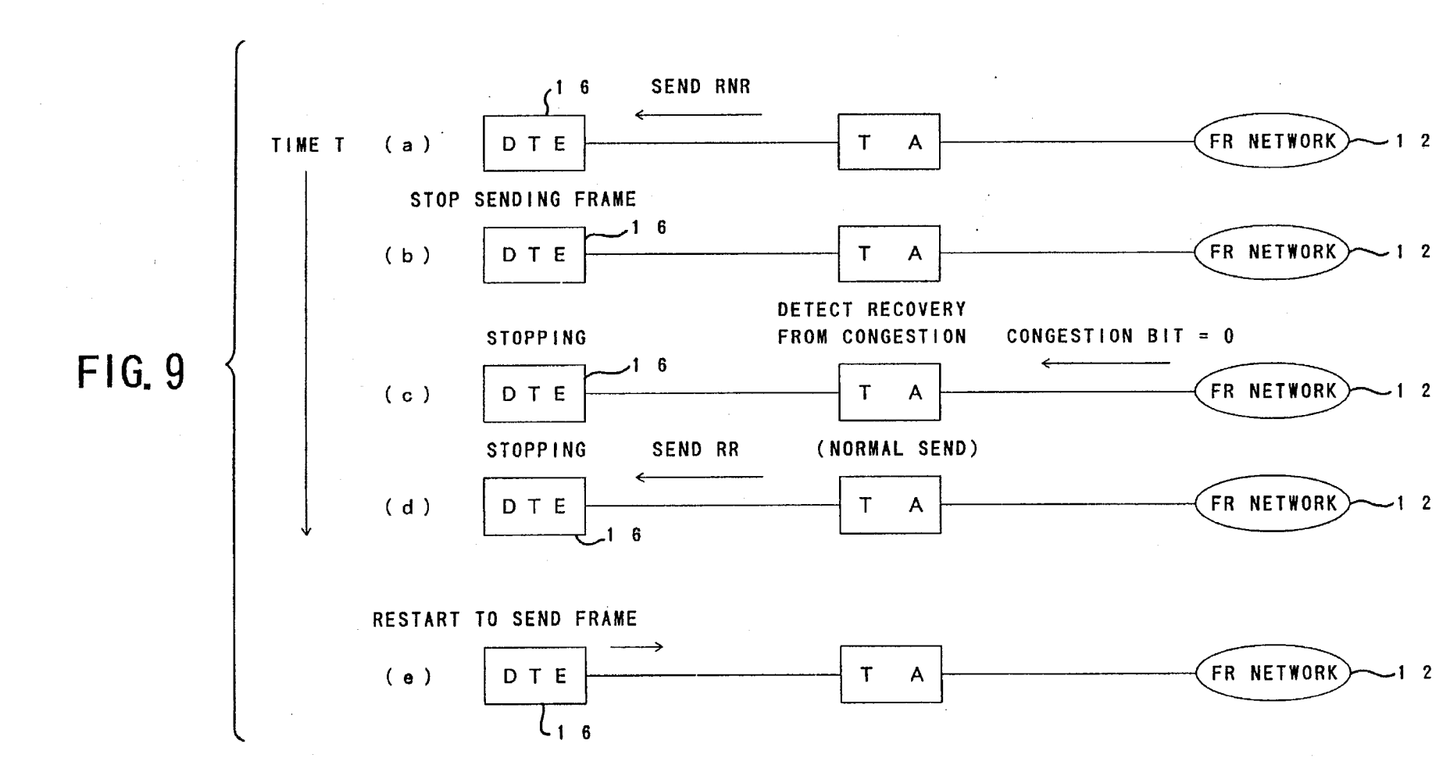
FIG. 9 is a diagram of the operation of the first embodiment of the present invention.

When the frame-relay network 12 is recovered from the congestion, the frame handler FH detects the recovery and changes the congestion notification bit FECN/BECN of the LAPF data to be sent from "1" to "1" (part (c) of FIG. 9). The congestion notification bit detecting unit 24 of the terminal adapter TA detects the above change and changes the setting in the register 242 (FIG. 6) from "1" to "0". After the time equal to one frame passes, the unit 24 turns OFF the switch 32 from ON via the register 242. The supervisory frame generating circuit 26 shown in FIG. 5 generates the RR frame in the above-mentioned manner, and outputs it to the packet terminal 16 (part (d) of FIG. 9).

The packet terminal 16 recognizes the received RR frame, and stops execution of the predetermined control process. Hence, the packet terminal 16 is allowed to send LAPD frame again (part (e) of FIG. 9).

According to the first embodiment of the present invention, the packet terminal 16 can recognize the occurrence of a congestion in the frame-relay network 12 and execute the predetermined control process for recovery from the congestion.

Figure 10:
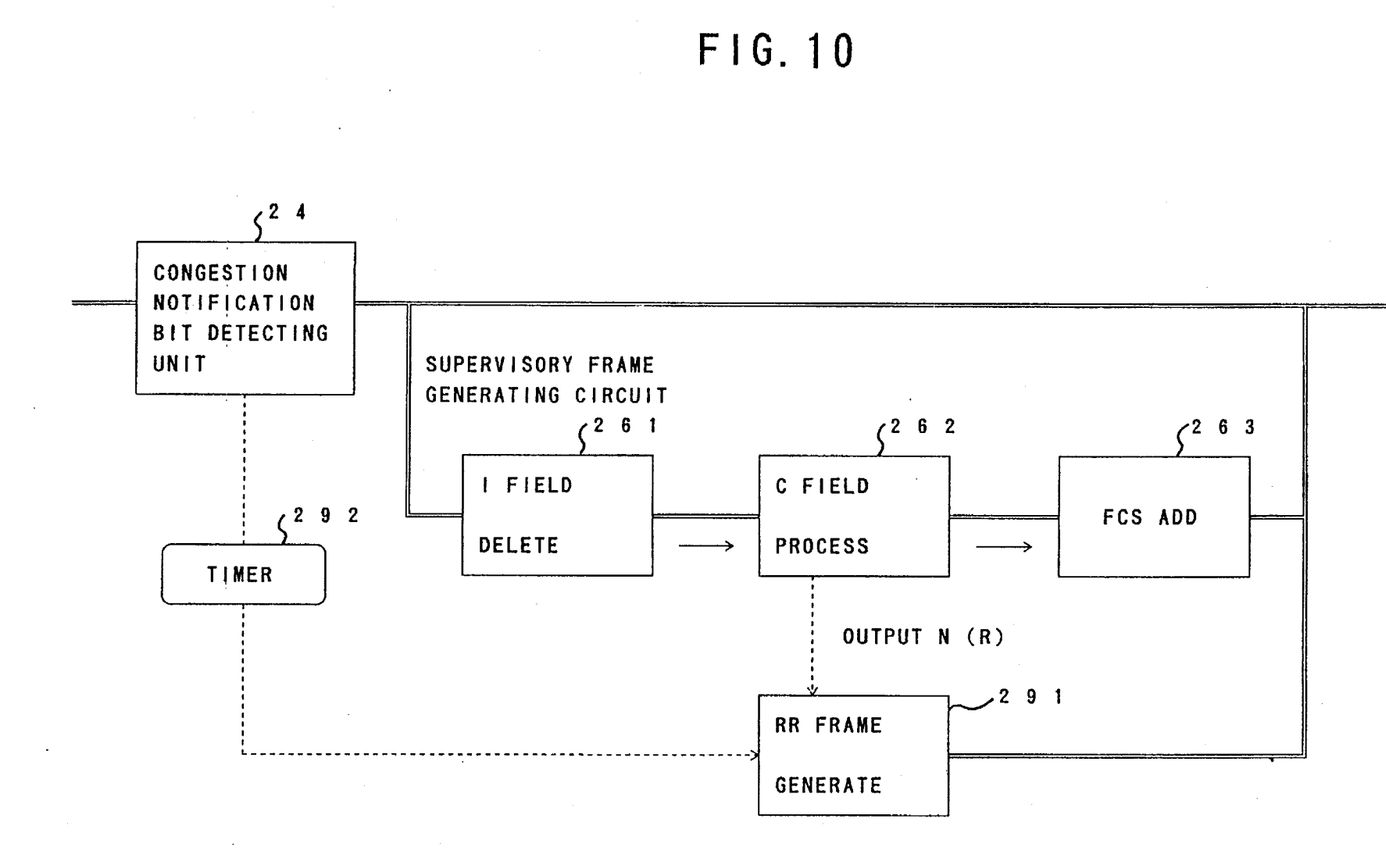
FIG. 10 is a block diagram of a terminal adapter according to a second embodiment of the present invention.

FIG. 10 is a block diagram of a second embodiment of the present invention. In FIG. 10, parts that are the same as those shown in the previously described figures are given the same reference numbers. More particularly, FIG. 10 shows the structure of the terminal adapter TA according to the second embodiment of the present invention in the communications system shown in FIG. 1. The terminal adapter TA according to the second embodiment of the present invention is configured by adding an RR frame generating unit 291 and a timer 292 to the structure shown in FIG. 5. In order to simply illustrate the structure of the terminal adapter TA of the second embodiment of the present invention, the frame disassembly unit 22 and the switch 32 shown in FIG. 5 are omitted in FIG. 10.

In the aforementioned first embodiment of the present invention, the packet terminal 16 stops execution of the predetermined process for recovery from a congestion and restarts to send data in the LAPD frame format when receiving the RR frame. In the above operation, if there is no communications data addressed to the packet terminal 16 from the remote terminal, the packet terminal 16 cannot recognize the recovery from the congestion. Hence, the congestion has been actually removed, nevertheless the packet terminal 16 continues to stop sending LAPD data as long as the packet terminal 16 recognizes the RR frame. Also, if a certain fault occurs, the same situation as the above takes place. In order to cope with the above situations, according to the second embodiment of the present invention, the timer 292 is provided which is activated at the time of detecting that the congestion notification bit FECN/BECN is turned ON. When the timer 292 measures a predetermined time, the timer 292 outputs a control signal to the RR frame generating unit 291. In response to the control signal, the RR frame generating unit 291 generates the RR frame including the RR frame and outputs it to the packet terminal. The control field processing unit 262 writes the receive frame number N(R) of the LAPF frame obtained when generating the RNR frame, that is, the receive frame number N(R) indicating the change of the congestion notification bit FECN/BECN from "0" to "1" into the RR frame generating unit 291. The RR frame generating unit 291 receives the control signal from the timer 292 and inserts the receive frame number N(R) stored in the unit 291 into the generated RR frame.

The predetermined time measured by the timer 292 can be arbitrarily selected taking into account the system configuration and other conditions.

Figure 11:
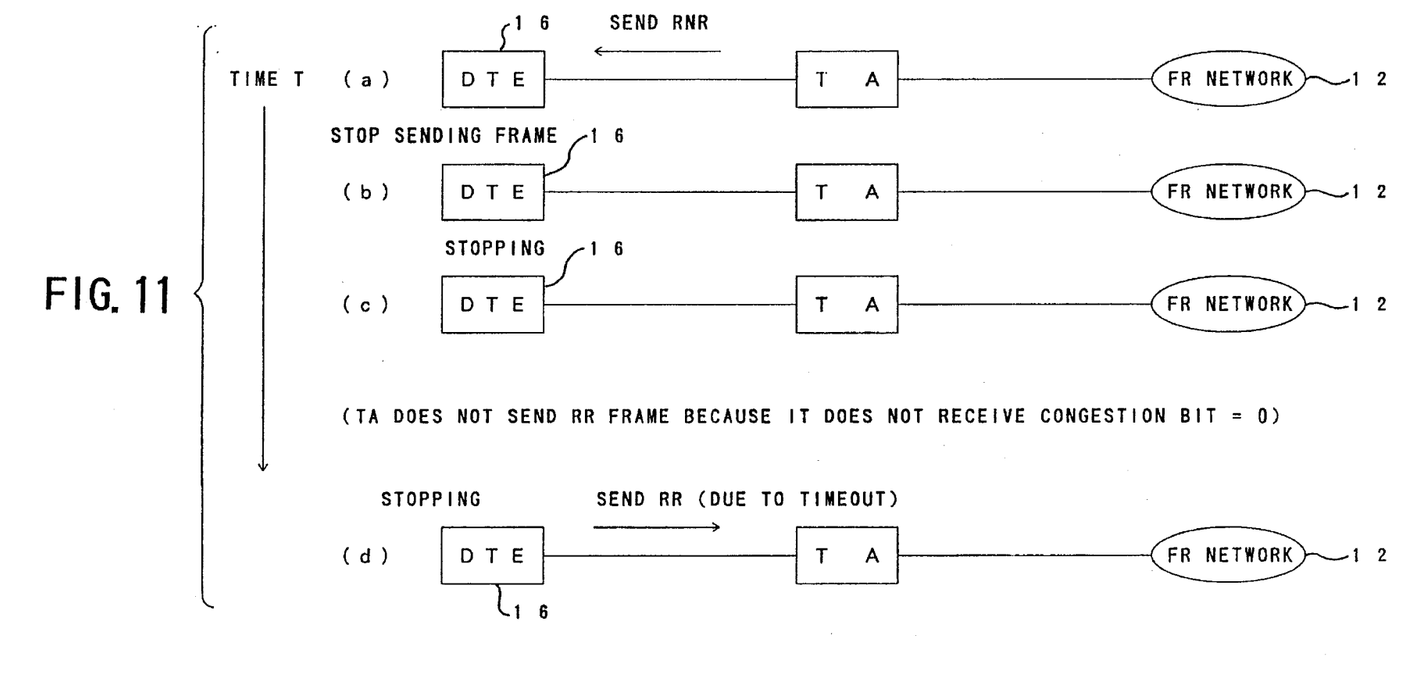
FIG. 11 is a diagram of the operation of the second embodiment of the present invention.

FIG. 11 is a diagram of the operation of the second embodiment of the present invention. The processes shown in parts (a) and (b) of FIG. 11 are the same as those shown in parts (a) and (b) of FIG. 9. When generating the RNR frame in part (a) of FIG. 11, the timer 292 shown in FIG. 10 is activated by the congestion notification bit detecting unit 24. In part (c) of FIG. 11 corresponding to part (c) of FIG. 9, the congestion has been removed, nevertheless the there is no notification indicating recovery from the convention due to a cause as mentioned previously. Hence, at that time, the terminal adapter TA does not send the RR frame to the packet terminal 16.

In part (d) of FIG. 11, when the timer 292 (FIG. 10) activated at the time of detecting the change of the congestion notification bit from "0" to "1" measures the predetermined time, the timer 292 outputs the control signal to the RR frame generating unit 291. Hence, it is possible to set the packet terminal to the normal operation state even in the case shown in part (c) of FIG. 11.

The two embodiments of the present invention have been described. It is possible to insert the LAPD data into the information field I of the LAPF without any modification (capsuling). In this case, the packet terminal extracts data from the information field I and detects the congestion notification bit.

The present invention is not limited to the communications systems which handle the LAPF data and the LAPD data, and is applicable to other signal formats. That is, it is enough for the terminal adapter TA to produce a signal recognizable by the terminal equipment.

According to the present invention, the terminal equipment accommodated via a terminal adapter in a network which processes signals in a format different from that in the terminal equipment can know the occurrence of a congestion taking place in the network and the recovery therefrom. In this case, the existing frame formats recognizable by the terminal equipment are used. Hence, there is no need to newly provide the terminal equipment with a special circuit notified of the occurrence of a congestion in the network and recovery therefrom. Hence, the present invention can easily reduced to practice. By slightly changing the receive data to generate data in a frame recognizable by the terminal equipment, the terminal equipment can be notified of the occurrence of a congestion and recovery therefrom. Hence, the efficient process can be performed. When the predetermined time passes from the notification of occurrence of a congestion, the terminal equipment is switched to the normal process from the control process for recovery from the congestion. Hence, it is possible for the terminal equipment to restart the data sending operation.

The present invention is not limited to the specifically disclosed embodiments, and variations and modifications may be made without departing from the scope of the present invention.

What is claimed is:

1. A congestion control method adapted to a communications system having a network, a terminal and a terminal adapter which is provided between the network and the terminal and interchanges a first frame format handled by the network and a second frame format handled by the terminal, said congestion control method comprising the steps of:

(a) receiving, at the terminal adapter, a signal sent in the first frame format via the network and detecting whether or not said signal includes congestion notification information indicating occurrence of a congestion in the communications system;

(b) sending a signal in the second frame format including first notification information to the terminal from the terminal adapter; and (c) performing, at the terminal, a predetermined control process for recovery from the congestion when the terminal receives said signal in the second frame format.

2. The congestion control method as claimed in claim 1, wherein the step (b) comprises the step of changing a part of said signal in the first frame format and producing the signal in the second frame format including the first notification information.

3. The congestion control method as claimed in claim 1, further comprising the steps of:

(d) receiving, at the terminal adapter, the signal sent in the first frame format via the network and detecting whether or not said signal sent in the first frame format includes congestion recovery notification information indicating recovery from the congestion in the communications system; and (e) sending a signal in the second frame format including second notification information to the terminal from the terminal adapter; and (f) stopping, at the terminal, execution of said predetermined control process when receiving said signal sent by the step (e).

4. The congestion control method as claimed in claim 1, further comprising the steps of:

(d) sending a signal in the second frame format including second notification information to the terminal from the terminal adapter when a predetermined time passes after the step (b); and (e) stopping, at the terminal, execution of said predetermined control process when receiving said signal sent in the step (d).

5. The congestion control method as claimed in claim 3, further comprising the steps of:

(g) detecting, at the terminal adapter, whether or not the congestion recovery notification information is received within a predetermined time after the step (b); and (h) sending a signal in the second frame format including the second notification information to the terminal from the terminal adapter when the congestion recovery notification information is not received within the predetermined time in the step (g).

6. The congestion control method as claimed in claim 1, wherein the network includes a network using a frame relay, and the terminal includes a packet terminal.

7. A terminal adapter adapted to a communications system having a network and a terminal, said terminal adapter being provided between the network and the terminal and interchanges a first frame format handled by the network and a second frame format handled by the terminal, said terminal adapter comprising:

first means for receiving a signal sent in the first frame format via the network and detecting whether or not said signal includes congestion notification information indicating occurrence of a congestion in the communications system; and second means for sending a signal in the second frame format including first notification information to the terminal, a predetermined control process for recovery from the congestion being carried out at the terminal when the terminal receives said signal in the second frame format.

8. The terminal adapter as claimed in claim 7, wherein said second means comprises means for changing a part of said signal in the first frame format and producing the signal in the second frame format including the first notification information.

9. The terminal adapter as claimed in claim 7, further comprising:

third means for receiving the signal sent in the first frame format via the network and detecting whether or not said signal sent in the first frame format includes congestion recovery notification information indicating recovery from the congestion in the communications system; and fourth means for sending a signal in the second frame format including second notification information to the terminal from the terminal adapter, the terminal stopping execution of said predetermined control process when receiving said signal sent by the fourth means.

10. The terminal adapter as claimed in claim 7, further comprising:

third means for sending a signal in the second frame format including second notification information to the terminal from the terminal adapter when a predetermined time passes after the second means sends the first notification information to the terminal, the terminal stopping execution of said predetermined control process when receiving said signal sent by the third means.

11. The terminal adapter as claimed in claim 9, further comprising:

fifth means for detecting whether or not the congestion recovery notification information is received within a predetermined time after the second means sends the first notification information to the terminal; and sixth means for sending a signal in the second frame format including the second notification information to the terminal from the terminal adapter when it is detected by the fifth means that the congestion recovery notification information is not received within the predetermined time.

12. The congestion control method as claimed in claim 7, wherein the network includes a network using a frame relay, and the terminal includes a packet terminal.

13. A communications system comprising:

a network;

a terminal; and a terminal adapter provided between the network and the terminal and interchanges a first frame format handled by the network and a second frame format handled by the terminal, said terminal adapter comprising:

first means for receiving a signal sent in the first frame format via the network and detecting whether or not said signal includes congestion notification information indicating occurrence of a congestion in the communications system; and second means for sending a signal in the second frame format including first notification information to the terminal, a predetermined control process for recovery from the congestion being carried out at the terminal when the terminal receives said signal in the second frame format.

14. The communications system as claimed in claim 13, wherein said communications system comprises:

another network that is connected to the network and handles the second frame format; and another terminal that is accommodated in the network and handles the second frame format.

15. A congestion control method adapted to a communications system having a network, a terminal and a terminal adapter which is provided between the network and the terminal and interchanges a first frame format handled by the network and a second frame format handled by the terminal, said congestion control method comprising the steps of:

(a) receiving, at the terminal adapter, a signal sent in the first frame format via the network and detecting whether or not said signal includes congestion notification information indicating occurrence of a congestion in the communications system; and (b) sending a signal in the second frame format including first notification information to the terminal from the terminal adapter.

16. A terminal adapter adapted to a communications system having a network and a terminal, said terminal adapter being provided between the network and the terminal and interchanges a first frame format handled by the network and a second frame format handled by the terminal, said terminal adapter comprising:

first means for receiving a signal sent in the first frame format via the network and detecting whether or not said signal includes congestion notification information indicating occurrence of a congestion in the communications system; and second means for sending a signal in the second frame format including first notification information to the terminal.

* * * * *